No. 813,402. PATENTED FEB. 27, 1906.
J. L. CHASE.
PORTABLE MEASURING CAN.
APPLICATION FILED MAR. 10, 1905.
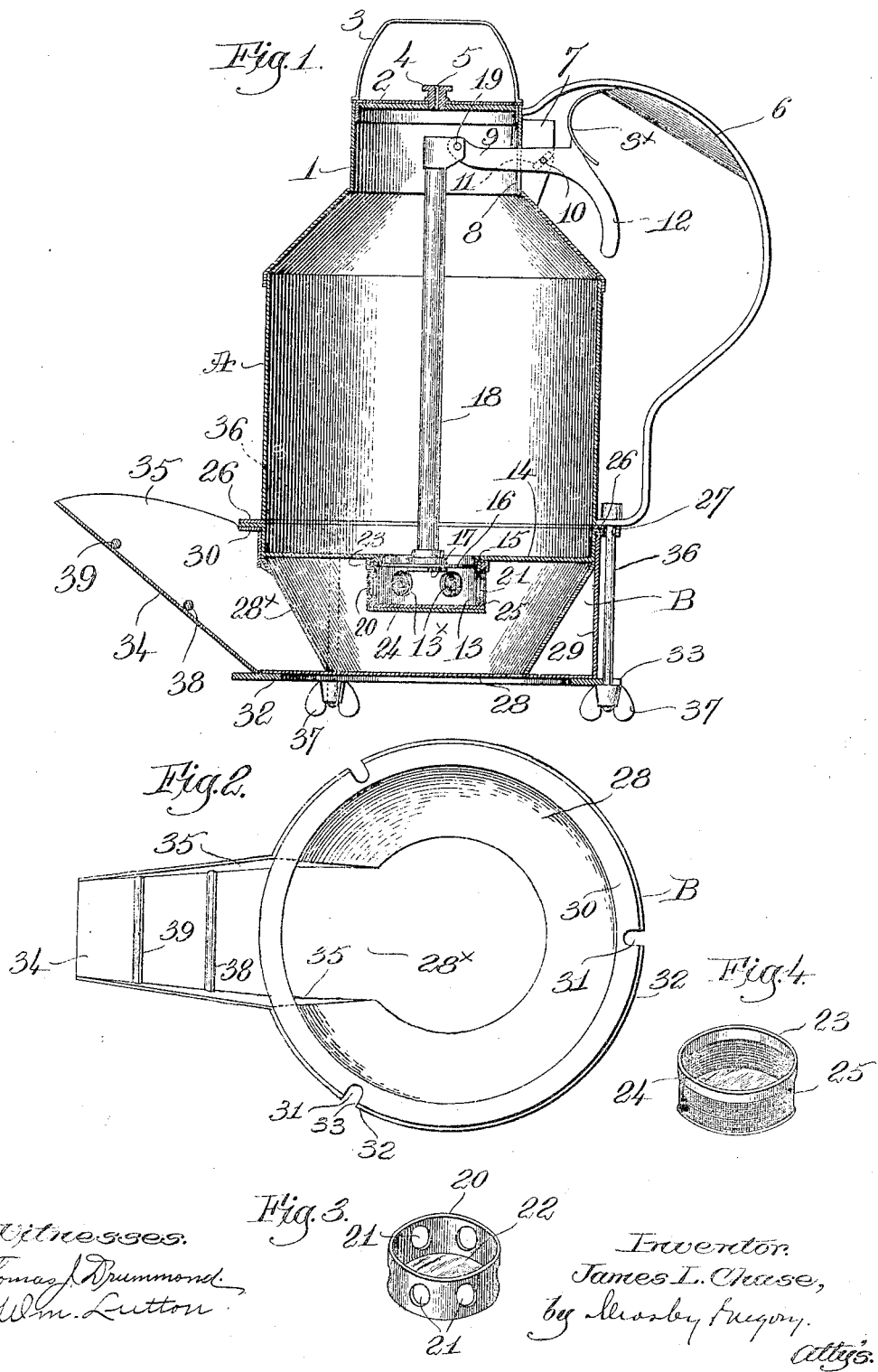
Witnesses.
Thomas J. Drummond
S. Wm. Lutton
Inventor.
James L. Chase,
by Mosby Gregory.
Attys.

UNITED STATES PATENT OFFICE.

JAMES L. CHASE, OF AYER, MASSACHUSETTS, ASSIGNOR OF ONE-HALF TO EDWARD A. TERRELL, OF NASHUA, NEW HAMPSHIRE.

PORTABLE MEASURING-CAN.

No. 813,402.　　　Specification of Letters Patent.　　　Patented Feb. 27, 1906.

Application filed March 10, 1905. Serial No. 249,396.

*To all whom it may concern:*

Be it known that I, JAMES L. CHASE, a citizen of the United States, and a resident of Ayer, in the county of Middlesex and State of Massachusetts, have invented an Improvement in Portable Measuring-Cans, of which the following description, in connection with the accompanying drawings, is a specification, like characters on the drawings representing like parts.

This invention has for its object the production of a portable measuring-can for dispensing any liquid, such as milk, in small portions and varying quantities, the construction being such that the measuring operation is greatly facilitated and the use of faucets or similar devices obviated.

In view of the fact that the greatest cleanliness is demanded by the consumer of those who handle and dispense milk I have constructed the measuring-can in such manner that it can be easily and quickly taken apart for scalding and cleaning and as readily put together.

The various novel features of my invention will be fully described in the subjoined specification, and particularly pointed out in the following claims.

Figure 1 is a vertical sectional view of a portable measuring-can embodying one form of my invention with the valve and its actuating means in elevation. Fig. 2 is a top or plan view of the measuring-compartment detached from the supply-tank. Fig. 3 is a perspective view of the means for regulating the size of the vent-orifices of the tank-outlet to be described, and Fig. 4 is a similar view of the detachable strainer.

In accordance with my invention in the embodiment herein illustrated I construct the can in two parts—a supply-tank A and a detachable measuring compartment or vessel B, Fig. 1, made of sheet metal and preferably nickeled or otherwise protected from rust or corrosion.

The tank A, tubular in form and of a convenient size for handling, is reduced in diameter at its upper end to form a filling-neck 1, provided with a suitable tightly-fitting closure or cap 2, having a handle 3 and a stud 4, provided with a small opening 5 for the admission of air, whereby the contents of the tank will flow freely when desired. A handle 6 is firmly secured to the tank, as clearly shown in Fig. 1, and on the neck 1 inside the handle two upright ears 7 are formed (one of them being shown in Fig. 1) at each side of a slot 8. A lever 9 is extended at its inner end through a slot and fulcrumed on the ears by a pin 10, having a head 11, (see dotted lines,) by which it can be pulled out when it is desired to remove the lever, the latter being the valve-actuator and having its outer end bent into a trigger form at 12, a spring $s^\times$ acting on the actuator to normally maintain it in the position shown. A tubular outlet 13 depends from the bottom 14 of the tank and has its wall provided with a series of orifices $13^\times$, an annular valve-seat 15 being formed within the outlet at its upper end, (see Fig. 1,) and a disk valve 16, firmly secured by a nut 17 to an upright stem 18, is adapted to slide in the outlet and normally to rest against the seat, and thereby close the outlet. The upper end of the stem is pivotally and detachably connected with the inner end 9 of the actuator by a pin 19, the spring $s^\times$ acting normally to seat the valve, as will be manifest. In order that the effective area of the orifices $13^\times$ may be varied to give a larger or smaller flow, I slip onto the outlet 13 a metallic cup-like device 20, (shown separately in Fig. 3,) having orifices 21, equal in number, size, and location to the orifices $13^\times$, the bottom 22 of the device being imperforate. This device slips onto the outlet 13 and is held thereon by friction, and by rotating it more or less a greater or lesser area of the orifices $13^\times$ will be uncovered, according to the rapidity of flow desired.

A strainer is shown separately in Fig. 4, comprising a holding-ring 23, a solid bottom 24, and foraminous walls 25, conveniently fine wire-netting, which inclose the outlet and the adjusting device, so that all liquid passing through the outlet must pass through the side walls of the strainer. The ring 23 fits with a tight friction fit on the wall of the adjusting device 20, as will be manifest, the several parts thus being readily detachable for cleaning whenever desired.

By putting the finger under the trigger 12 and drawing up on it the valve 16 will be unseated, and the contents of the tank A can pass through the outlet, the trigger being manipulated by the hand of the operator grasping the handle 6. An annular flange 26 is formed on the exterior of the tank near its bottom, and said flange is provided with several notches, as 27, for a purpose to be described.

The measuring compartment or vessel B is herein shown as comprising an inner conical or flaring wall 28 and a cylindrical external wall 29, having an annular external flange 30 at its upper end radially notched at 31 to register with the notches 27 referred to. A flat base-ring 32 is secured to the bottom of the measuring-compartment and similarly notched at 33. The circular wall 29 is provided with a discharge-spout having an upwardly-inclined radially-extended bottom 34 and high side walls 35, which latter extend inward to meet the flaring wall 28, leaving an opening 28× therein, (see Fig. 2,) the top of the spout being open. The bottom of the tank B fits tightly into the upper part of the circular wall 29, as in Fig. 1, the flanges 26 and 30 abutting against each other, while the notches 27 register with notches 31 and are positioned above the notches 33 of the base-ring 32. Headed clamping or coupling rods 36 are inserted into the notches, as shown clearly in Fig. 1, and clamp-nuts 37 are then screwed upon the threaded lower ends of the rods against the bottom of the ring 32, thereby drawing the flanges 26 and 30 firmly against each other and locking the tank and measuring-compartment together. Three of the coupling-rods are shown arranged symmetrically around the can; but the number or the exact construction of the coupling-rods is immaterial.

I have provided means to indicate by its level the quantity of liquid in the measuring-compartment B, and to this end small bars 38 39 are secured to the spout-bottom on its upper side parallel to each other and in planes parallel to the bottom of the compartment. When the level of the liquid in the compartment rises to the bar 38, it may indicate one pint, for instance, while the liquid-level corresponding to bar 39 will indicate one quart.

The milkman fills the supply-tank A, which will hold several quarts, and when the house of a customer is reached the can is taken out of the wagon and held upright, while the trigger 12 of the valve-actuator is lifted, opening the valve, and the milk flows into the measuring-compartment. As soon as the liquid-level rises to the desired mark 38 or 39 the actuator is released, the valve instantly closing, and then the can is tipped, the measured milk being discharged from the spout into the jar or pan provided by the customer. The manipulation of the can is manifestly rapid and easy, there is no covering and uncovering of a big can and slopping of milk around with ample opportunity for dirt to enter, and an accurate quantity of milk is measured out. In winter the can will not freeze up, and in summer dust is kept out. By making the wall 28 flaring the milk will rise higher in the spout for a given quantity, making it easier to read the indications.

My invention is not restricted to the precise construction and arrangement shown and described, as the same may be modified or rearranged in different particulars by those skilled in the art without departing from the spirit and scope of my invention.

Having described my invention, what I claim as new, and desire to secure by Letters Patent, is—

1. In a measuring milk-can, a supply-tank having an outlet in its bottom, a controlling-valve for said outlet, means to manually operate the valve, a measuring-compartment below the tank and into which the outlet opens, and provided with an open-top discharge-spout, and level-indicators within the spout and visible through its open top to indicate the quantity of liquid in the measuring-compartment by the level of the liquid in said compartment and spout.

2. In a portable milk-can, in combination, a supply-tank having a filling-opening, and an outlet in its bottom, a controlling-valve for the outlet, a handle attached to the tank, means to manually operate the valve, including an actuator adjacent the handle, a single measuring-compartment below the tank and having an open-top discharge-spout, and means located in the spout to indicate visually different quantities of liquid admitted to the measuring-compartment from the tank.

3. In a portable milk-can, in combination, a supply-tank having a handle and an outlet in its bottom, a manually-operated controlling-valve for the outlet, a detachable strainer surrounding the outlet and valve, a detachable measuring-compartment having an open top and adapted to tightly fit the lower end of the tank, means to fixedly connect the tank and compartment, the latter having an upwardly-inclined spout, and visual means within the spout to indicate the quantity of liquid admitted to the measuring-compartment.

4. In a device of the class described, a supply-tank having a tubular outlet depending from its bottom and provided with orifices in its wall, means mounted on the outlet to vary the effective area of the orifices, a valve slidable within the tubular outlet, and manually-operated means to control the valve, combined with a measuring-compartment connected with the bottom of the tank and having a discharge-spout, and means to indicate by the level of liquid in the measuring-compartment the quantity admitted from the tank.

5. In a measuring milk-can, a supply-tank having an outlet in its bottom, a manually-operated controlling-valve therefor, a measuring-compartment below and connected with the bottom of the tank having upwardly-flared walls and a radial, upwardly-inclined spout, and means located within the spout to indicate different quantities of liquid in said compartment.

6. In a portable milk-can, in combination, a supply-tank having a filling-opening and an outlet in its bottom, a controlling-valve for the outlet having an attached, upright stem, an actuating-lever fulcrumed on the tank and extended thereinto, a pivotal, detachable connection between the valve-stem and the inner end of the lever, a spring cooperating with the latter to normally maintain the valve seated, a handle on the tank and serving also as a guard for the outer end of the lever, a measuring-compartment connected with the bottom of the tank, and means to indicate visually the quantity of liquid admitted to the compartment when the valve is manually moved to open the outlet.

7. In a device of the class described, a supply-tank having a filling-opening in its top and a closure therefor, a depending, tubular outlet in its bottom, a controlling-valve slidable in the outlet, the wall of the latter having vent-orifices, a detachable, cup-like strainer to fit over the said outlet, and manually-operated means to actuate the valve, combined with a measuring-compartment open at its top to snugly receive the bottom of the tank, detachable means to maintain the tank and compartment connected, a discharge-spout for the compartment, having an inclined bottom and an open top, and level-indicating bars on the spout-bottom to indicate the quantity of liquid in the compartment.

In testimony whereof I have signed my name to this specification in the presence of two subscribing witnesses.

JAMES L. CHASE.

Witnesses:
GEORGE H. COLE,
HENRY G. TURNER.